(12) United States Patent
Nakagaki et al.

(10) Patent No.: US 6,857,166 B2
(45) Date of Patent: Feb. 22, 2005

(54) CUSHION

(75) Inventors: Osamu Nakagaki, Aichi (JP); Yasushi Ido, Aichi (JP); Katsuya Hadano, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 45 days.

(21) Appl. No.: 10/291,486

(22) Filed: Nov. 12, 2002

(65) Prior Publication Data

US 2003/0088940 A1 May 15, 2003

(30) Foreign Application Priority Data

Nov. 13, 2001 (JP) .................................... P2001-347165
Nov. 22, 2001 (JP) .................................... P2001-357004

(51) Int. Cl.⁷ .................................................. E05F 5/06
(52) U.S. Cl. ..................................... 16/86 R; 403/282
(58) Field of Search .......................... 16/46 R, 49, 74, 16/85, 86 A; 403/274, 280, 282, 285, 353, 361, 375, 381; 267/140

(56) References Cited

U.S. PATENT DOCUMENTS

| | | | | |
|---|---|---|---|---|
| 2,121,961 A | * | 6/1938 | Gill | 404/10 |
| 2,367,657 A | * | 1/1945 | Boersma | 52/511 |
| 2,596,780 A | * | 5/1952 | Meyers | 267/140 |
| 2,699,809 A | * | 1/1955 | Nebe et al. | 16/86 A |
| 2,735,673 A | * | 2/1956 | Muller | 267/292 |
| 2,813,712 A | * | 11/1957 | Stanis | 267/257 |
| 4,739,912 A | * | 4/1988 | Klawieter et al. | 223/85 |
| 5,722,115 A | * | 3/1998 | Arens | 16/85 |
| 6,192,552 B1 | * | 2/2001 | Murphy | 16/85 |

FOREIGN PATENT DOCUMENTS

JP          A-1-63838 U          4/1989

* cited by examiner

*Primary Examiner*—Gary S. Hartmann
(74) *Attorney, Agent, or Firm*—Posz & Bethards, PLC

(57) ABSTRACT

A cushion body of a rubber-like elastic element having cushioning function in which engagement holes including a cave and a pit are formed. The cave is formed so that a horizontal head of a T-shaped clip is inserted into a space provided at the side of a bottom surface portion. The pit is formed so as to extend in a direction perpendicular to the cave, and to be opened in the bottom surface portion, permitting a vertical shaft of the clip to be inserted thereinto. The clip is formed with a plastic material and T-shaped and has a plurality of engaging claws flared toward the root portion from an end part of the vertical shaft of the T-shaped portion. The clip is engaged with the engagement holes of the cushion body.

15 Claims, 6 Drawing Sheets

FIG. 1
FIG. 2
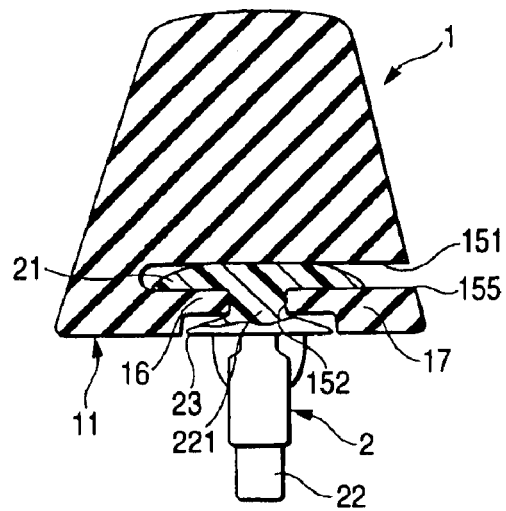
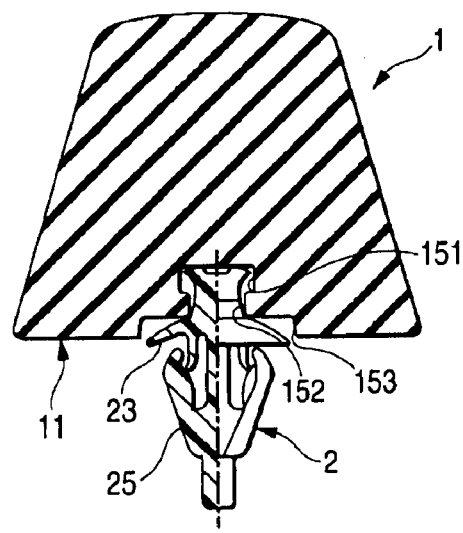
FIG. 3
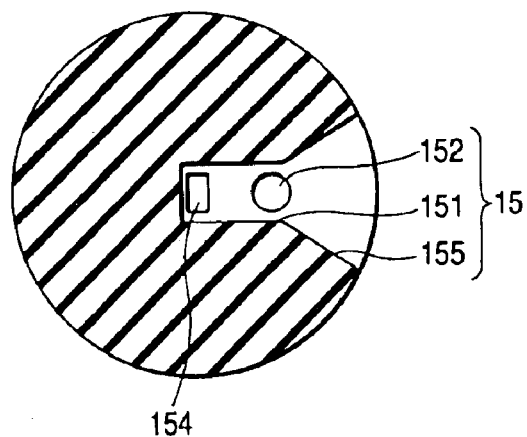

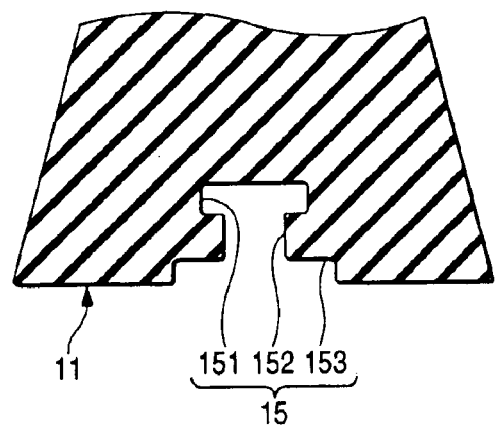
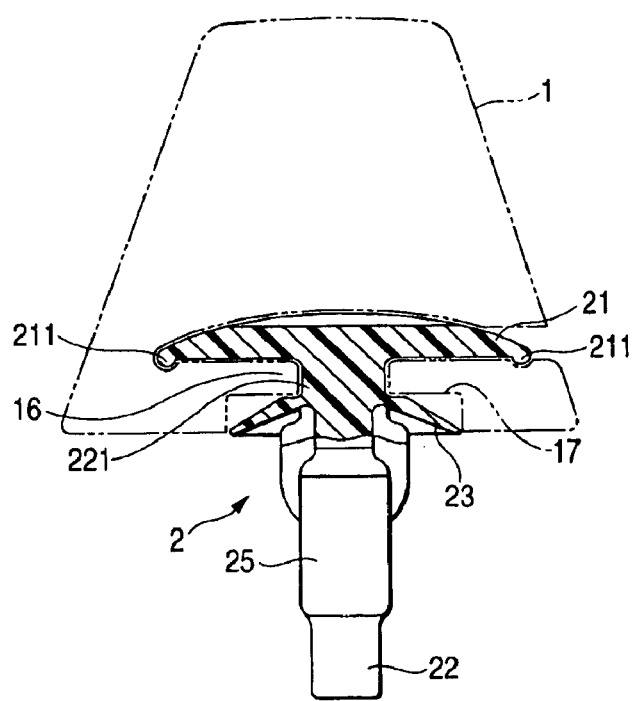
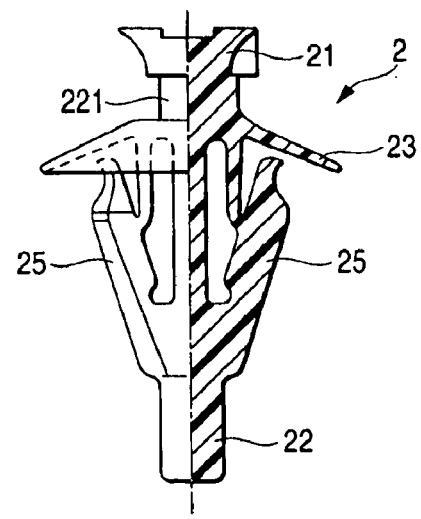

CUSHION

The present application is based on Japanese Patent Applications Nos. 2001-347165 and 2001-357004, the entire contents of which are incorporated herein by reference.

BACKGROUND OF THE INVENTION

1. Field of the Invention

This invention generally relates to a cushion provided on a door or a lid, and enabled to alleviate an impact force (or load) inputted to a door or a lid when such a door or a lid is closed. More particularly, this invention relates to an assembly type cushion consisting of two members, of which a cushion body is formed from a rubber member and which a clip portion constituting an engagement portion is formed from a plastic material having a predetermined stiffness so that the cushion excels in the mountability (or assemblability), and that the members of the cushion are prevented from dropping off therefrom after once assembled.

2. Related Art

As illustrated in, for example, FIG. 14, such a conventional cushion consists of a cushion body 110, which is shaped like a frustum and has an impact absorption function, and an engagement portion 120, which is provided on a bottom surface portion 210 of this frustum-like cushion body and has an insertion portion 130 that is shaped like a ring and comprises a tapered surface. Further, such portions are integrally formed from materials, such as a rubber material.

Meanwhile, when the cushion of such a configuration is mounted on a predetermined mounting member 190 (see FIG. 14), the smoothability between the insertion portion 130 and the mounting member 190 is not good because the insertion portion 130 is constituted by a rubber member. To cope with this, a lubricant is applied thereto. However, the conventional cushion has a problem that the mountability (or assemblability) thereof is insufficient. To solve this mountability problem, the diameter of a mounting hole provided at the side of the mounting member 190 is sometimes increased. However, in the case of prioritizing the mountability, there is caused a problem that when a load (or force) is applied on the cushion body 110 in a direction perpendicular to the axis thereof after the cushion is mounted (or assembled) thereonto, the cushion itself is prized up and drops off therefrom.

As for another example, a cushion described in JP-A-1-063838U is cited as a conventional cushion consisting of two members. This cushion consists of a cushion body made of a rubber material, and a clip portion formed from a plastic material. The connection between the cushion body and the clip portion is established by preliminarily fitting the clip portion, which is formed into a predetermined shape, into a mold, and injecting a predetermined rubber material into such a mold to thereby form the cushion body, and simultaneously performing integration between the clip portion and the cushion body.

Meanwhile, in the case of the conventional cushion, the clip portion formed from the plastic material, and the cushion body formed from the rubber material are not chemically connected to each other. Further, in order to perform insert molding for the clip portion, it is necessary to set it onto the mold, keeping a desired positional accuracy. Such the operation requires precise works of setting the clip as well as a complicated mold configuration. Therefore, cost reduction cannot be obtained. Moreover, in terms of forming materials, it is necessary to use expensive heat-resistant resins which are not undergone heat deformations at the time of vulcanization of the rubber material. Thus it is also disadvantageous in cost that inexpensive general-purpose resins are not applicable.

SUMMARY OF THE INVENTION

To solve the aforementioned problems, an object of the invention is to provide a cushion that excels in mountability and that is prevented from easily dropping off after once mounted. More specifically, in the invention, there is provided a cushion that consists of two members, of which a cushion body and a clip portion are firmly connected to each other, and that is enabled to establish such connection therebetween by performing a relatively easy operation. Further there is provided a cushion that excels in mountability and that is prevented from easily dropping off after once mounted by providing an internal-space groove in the insertion portion of the engagement portion.

(1) The invention provides the following means (hereunder referred to as a first cushion of the invention), which has a cushion body serving as stopper and also has a clip that is attached to the cushion body and adapted to contribute to the mounting of the cushion to a mounting member. In the first cushion, the clip comprises a horizontal head and a vertical shaft provided so as to extend in a direction perpendicular to the horizontal head. The vertical shaft is adapted to have an engagement portion to be engaged with the mounting member. On the other hand, the cushion body is formed so as to perform a cushioning function, and as to have a cave, which accommodates the horizontal head of the clip, and a pit that accommodates the vertical shaft of the clip. The cushion body further has a through hole formed so as to extend in a horizontal direction from an end of the cave. An elastic deformation portion is formed around the cave, the pit and the through hole. With such a configuration, according to the first cushion of the invention, the integration of the clip and the cushion body is achieved by performing a simple assembling operation. Further, in the case of the first cushion formed in this manner, the mounting thereof to the mounting member, such as a door panel, is easily performed. Moreover, after the cushion is once mounted therein, the engagement portion engages the mounting member, so that the cushion does not easily disengage therefrom.

(2) An embodiment (hereunder referred to as a second cushion of the invention) of the first cushion of the invention is described hereinbelow. The second cushion of the invention is similar in basic configuration to the first cushion of the invention. That is, the second cushion of the invention is configured so that the second cushion has constituent elements of the first cushion of the invention and that during a state in which an end part of the horizontal head of the clip is inserted into the pit, and in which the inserted end part of the horizontal head of the clip is led to the through hole formed in such a manner as to be opened in a side face part of the cushion body, the entire horizontal head of the clip is inserted into the cave and the vertical shaft is inserted into the pit by simultaneously and elastically deforming the elastic deformation portion of the cushion body thereby to perform the integration of the cushion body and the clip.

With such a configuration, according to the second cushion of the invention, the attachment of the clip to the cushion body is conducted by performing a simple snap operation. In the second cushion assembled in this manner, the clip and the cushion body are rigidly connected to each other. Further, in the case of the second cushion formed in this manner, the mounting thereof to the mounting member is easily performed, similarly as in the case of the first cushion of the invention. Moreover, after the cushion is once mounted therein, the engagement portion engages the mounting member, so that the cushion does not easily disengage therefrom.

(3) An embodiment (hereunder referred to as a third cushion of the invention) of the third cushion of the invention is described hereinbelow. The third cushion of the invention is similar in basic configuration to the first or second cushion of the invention. That is, the third cushion of the invention is configured so that the third cushion has constituent elements of the first or second cushion of the invention and that the horizontal head of the clip is shaped like a lampshade. With such a configuration, according to the third cushion of the invention, the attachment of the clip to the cushion body is achieved by performing a simple operation, similarly as in the case of the first or second cushion of the invention. Further, in the case of the third cushion integrated in this manner, the horizontal head of the clip, which portion composes the connection portion between the cushion body and the clip, is constituted by a lampshade-like element of a large area. Thus, both the clip and the cushion body are more rigidly connected to each other. Consequently, during the use of the third cushion of the invention, both the clip and the cushion body do not disengage from each other.

(4) An embodiment (hereunder referred to as a fourth cushion of the invention) of the first or second cushion of the invention is described hereinbelow. The fourth cushion of the invention is similar in basic configuration to the first or second cushion of the invention. That is, the fourth cushion of the invention is configured so that the fourth cushion has constituent elements of the first or second cushion of the invention and that the clip is T-shaped. With such a configuration, according to the fourth cushion of the invention, the attachment of the clip to the cushion body is achieved by performing a simple operation, similarly as in the case of the first or second cushion of the invention. Especially, the fourth cushion of the invention is configured so as to be T-shaped. Thus, the insertion of the horizontal head of the clip into the pit and cave provided in the cushion body is relatively easily performed. Consequently, the attachment of the clip to the cushion body is efficiently performed.

(5) An embodiment (hereunder referred to as a fifth cushion of the invention) of one of the first to fourth cushions of the invention is described hereinbelow. The fifth cushion of the invention is similar in basic configuration to the one of the first to fourth cushions of the invention. That is, the fifth cushion of the invention is configured so that a flange portion is provided at a lower part of the horizontal head of the clip and on the vertical shaft so as to project therefrom in a direction perpendicular to a direction of an axis of the cushion. With such a configuration, according to the fifth cushion of the invention, the integration of the cushion body and the clip, that is, the assembly thereof is smoothly performed, similarly as in the case of the one of the first to fourth cushions of the invention. Further, in addition, the fifth cushion of the invention is adapted so that the horizontal head and the flange portion, which are provided on the clip, hold a part provided around the elastic deformation portion so as to sandwich this part. Thus, the integration (or connection) between the clip and the cushion body is firmly held. Consequently, during the use of the fifth cushion of the invention, the cushion and the clip do not disengage from each other.

(6) According to the invention, the invention provides the following means (hereunder referred to as a sixth cushion of the invention), which has a cushion body serving as stopper and also has an engagement portion provided in such a way as to be continued to the cushion body and as to contribute to the mounting thereof onto a mounting member. The sixth cushion comprises a connecting portion, formed in such a way as to be easily deformable, for connecting between the engagement portion and the cushion body. With such a configuration, according to the sixth cushion of the invention, when the engagement portion is mounted in the mounting hole of the mounting member, in the case that a load acting in a direction perpendicular to the axis of the cushion, the connecting portion deforms, so that a side face part of the cushion body comes in contact around a mounting face of the mounting member. Therefore, no more load (or force) is applied to the engagement portion. Consequently, the engagement portion is held in a state in which the engagement portion engages around the mounting hold of the mounting member. Thus, the engagement portion does not drop off the mounting member.

(7) An embodiment (hereunder referred to as a seventh cushion of the invention) of the seventh cushion of the invention is described hereinbelow. The seventh cushion of the invention is similar in basic configuration to the sixth cushion of the invention. That is, the seventh cushion of the invention is configured in such a way as to have constituent elements of the seventh cushion of the invention and as to impart a predetermined elastic resiliency to the plate-like connecting portion. With such a configuration, according to the seventh cushion of the invention, the entire engagement portion is reduced in diameter by the action of the internal-space groove, similarly as the engagement portion of the sixth cushion of the invention. Consequently, the mounting of the cushion in the mounting hole provided in the mounting member is simply performed. Further, after the cushion is once mounted therein, the connecting portion deforms, so that a part of the cushion body comes in contact with the mounting member, and that no more load for causing the engagement portion to drop off the mounting hole is applied to the engagement portion. Furthermore, during such a state, after the load acting in the direction perpendicular to the axis of the cushion body is eliminated, the cushion body is put back by the action of the resiliency to an original state, so that the cushion body performs a normal cushioning operation.

(8) Another embodiment (hereunder referred to as an eighth cushion of the invention) of the sixth cushion of the invention is described hereinbelow. This eighth embodiment is similar in basic configuration to the sixth cushion of the invention. That is, the eighth cushion of the invention is configured so that the eighth cushion has constituent elements of the sixth cushion of the invention and that an internal-space groove is provided in the engagement portion in such a way as to extend from a surface of the engagement portion, which faces the cushion body, in a direction parallel to a direction of an axis of the engagement portion. With such a configuration, according to the eighth cushion of the invention, the entire engagement portion is reduced in diameter by the action of the internal-space groove, similarly as the engagement portion of the sixth cushion of the invention. Consequently, an operation of mounting the cushion in the mounting hole provided in the mounting member can smoothly be performed. Further, after the cushion is once mounted therein, the engagement portion is put back to the initial state in which the engagement portion has a spread shape. Thus, the eighth cushion of the invention does not easily drop off from the mounting hole.

(9) An embodiment (hereunder referred to as a ninth cushion of the invention) of the eighth cushion of the invention is described hereinbelow. This ninth embodiment is similar in basic configuration to the eighth cushion of the invention. That is, the ninth cushion of the invention is configured so that the ninth cushion comprises constituent elements of the eighth cushion of the invention and further comprise a thin film portion formed in such a manner as to intersect a transversal section of the engagement portion and as to be perpendicular to the connecting portion. With such a configuration, according to the ninth cushion of the invention, when a load acting in the direction perpendicular to the axis of the engagement portion is applied to the cushion body, the thin film portion exerts the resiliency that acts in response to an occurrence of a deformation phenomenon in the connecting portion in such a way as to put back the connecting portion to an original state, so that the cushion body, in which what is called a falling phenomenon occurs, can be returned to an original state.

(10) An embodiment (hereunder referred to as a tenth cushion of the invention) of one of the sixth to ninth cushions of the invention is described hereinbelow. This tenth embodiment is similar in basic configuration to the one of the sixth to ninth cushions of the invention. That is, the tenth cushion of the invention is configured in such a way as to further comprise a fitting portion formed at a part of the engagement portion, which part faces the cushion body, in such a manner as to project toward the cushion body and as to be inserted into a mounting hole provided in the mounting member, and an engaging face portion provided on an outer circumferential part of the fitting portion and formed in such a way as to engage an outer circumferential portion of the mounting hole. With such a configuration, according to the tenth cushion of the invention, the entire engagement portion is reduced in diameter by the action of the internal-space groove, similarly as the engagement portion of one of the sixth to ninth cushions of the invention. Consequently, an operation of mounting the cushion in the mounting hole provided in the mounting member can smoothly be performed. Further, after the cushion is once mounted therein, the engaging face portion, which is formed in such a way as to have a predetermined contact area, keeps engaging around the mounting hole in response to, for instance, a load inputted in the direction perpendicular to the axis thereof. Thus, the engagement state of the engagement portion is reliably held. Consequently, the tenth cushion of the invention does not easily drop off from the mounting hole.

BRIEF DESCRIPTION OF THE DRAWINGS

FIG. 1 is a partly sectional view illustrating a state in which a horizontal head of a T-shaped clip engages a cushion body according to the invention;

FIG. 2 is a longitudinal sectional view illustrating an engagement state between the cushion body and the clip;

FIG. 3 is a transversally sectional view illustrating the configuration of a cave and a through cave of the cushion body according to the invention;

FIG. 4 is a partly sectional view illustrating the configuration of engagement holes of the cushion body according to the invention;

FIG. 5 is a partly sectional view illustrating the configuration of the entire clip according to the clip and the structure of the T-shaped horizontal head thereof;

FIG. 6 is a half-sectional and outside view illustrating the configuration of the entire clip;

FIG. 11 is a half-sectional and outside view illustrating the configuration of the entire cushion according to the invention, and taken from a direction perpendicular to a direction in which FIG. 9 is taken;

DETAILED DESCRIPTION OF THE PREFERRED EMBODIMENTS

Figure 7A:
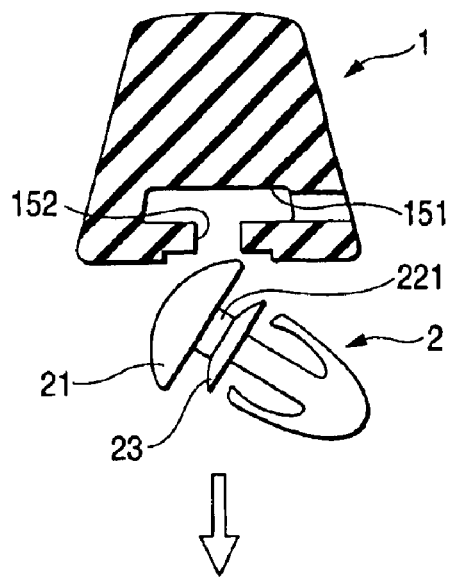
FIGS. 7A to 7C are explanatory views illustrating a procedure for attaching the clip to the cushion body according to the invention.

Hereinafter, a first embodiment of the invention is described with reference to FIGS. 1 to 8. As shown in FIGS. 1 and 2, this first embodiment is configured so as to basically comprise a cushion body 1, which is shaped like a frustum and made of a rubber material or an elastomer material, and also comprise a clip 2 that is provided in such a manner as to be erected from a bottom surface portion 11 of the frustum constituting the cushion body 1 and as to be used for mounting the cushion in a mounting hole 91 provided in a mounting member 9, and that is entirely formed from a predetermined plastic material.

Figure 8:
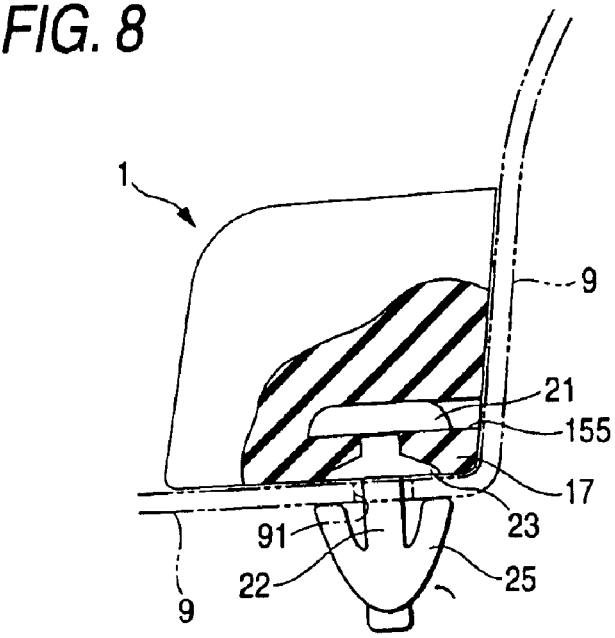
FIG. 8 is a sectional view illustrating a state in which the cushion according to the invention is mounted on a mounting member.

Incidentally, the shape of the cushion body 1 is not limited to the frustum shown in FIG. 1 or 2, and may be other ones, such as a column and a distorted quadrangular pyramid shown in FIG. 8, as long as the cushion body of such a shape has an impact absorption function or a cushioning function. Further, as shown in FIGS. 1 and 2, the engagement holes 15, into each of which a corresponding part of the T-shaped clip 2 is inserted, is provided at a place close to the bottom surface part 11 of the cushion body having such a cushioning function. Practically, as illustrated in FIGS. 1 to 4, this engagement hole 15 basically includes a cave 151, into which the horizontal head 21 of the T-shaped clip 2 is inserted, and also includes a pit 152 provided so that the pit 152 is perpendicular to the cave 151 and that the root part 221 of the vertical shaft 22 of the clip 2 is inserted into the pit 152. Further, as illustrated in FIGS. 1 and 3, a through cave 155 formed so as to be opened in the side face part of the cushion body 1 is provided in such a manner as to extend from one end portion of the cave 151 included in the engagement holes 15. Furthermore, a recess portion 154 formed is provided at the other end portion of the cave 151, which is opposite to the side of the through cave 155, so that when the horizontal head 21 of the T-shaped clip 2 is mounted therein, a projection portion 211 formed on an end part of the horizontal head 21 is inserted into the recess portion 154 (see FIG. 3). Furthermore, at an opening portion of the pit 152 of such engagement holes 15, which portion is opened in the bottom surface portion 11, a counterbored portion 153, whose horizontal section is shaped like a predetermined circle, is provided, as shown in FIGS. 2 and 4. In this portion 153, a flange portion 23 (to be described later) provided in the T-shaped clip 2 is accommodated. Further, an elastic holding portion 16, which is operative to hold the vertical shaft 22, and an elastic deformation portion 17, which largely and elastically deforms when the clip 2 is attached to the cushion body, are provided around the pit 152.

Next, the clip 2 mounted (or connected) in the engagement hole 15 of the cushion body 1 of such configuration is described hereinbelow. Basically, this clip 2 is T-shaped and formed form a predetermined plastic material, as illustrated in FIGS. 5 and 6. That is, as shown in FIGS. 1 and 5, fundamentally, this clip 2 consists of a horizontal head 21 and a vertical shaft 22, which constitute a T-shaped element. In the clip 2 of such a basic configuration, projection portions 211 are provided at both end parts of the horizontal head 21, respectively, so as to downwardly project therefrom. When this clip 2 is engaged in the engagement holes 15 of the cushion body 1, this projection portion 211 is inserted into the recess portion 154 provided in the cave 151, which is included in the engagement holes 15, to thereby reliably achieve the postioning of the clip 2 in the cushion body 1. Incidentally, the shape of the clip 2 of such a configuration is not limited to a T-like shape. In addition, a lampshade-like shape formed by projecting out the horizontal head 21 like a disk, i.e., generally shaped as a spherical segment of one or two bases, may be employed as the shape of the clip 2.

Further, the vertical shaft 22 is provided at the central part of the horizontal head 21 in such a way as to extend therefrom in a direction perpendicular to the horizontal head 21. Moreover, the root portion 221 thereof is adapted to be inserted into the pit 152 included in the engagement holes 15. Furthermore, a lampshade-like flange portion 23 is provided just under this root portion 221. The elastic holding portion 16 and the elastic deformation portion 17 provided around the pit 152 of the cushion body 1 are sandwiched by this flange portion 23 and the horizontal head 21. Furthermore, at a lower portion of the flange portion 23 of such a configuration, a plurality of engaging claws 25 formed in such a way as to flare from a lower part of the vertical shaft toward the con-shaped-hat-like flange portion 23 are provided, as illustrated in FIGS. 2 and 6. These engaging claws 25 are normally opened, as shown in FIG. 6. When the engaging claws 25 are attached to the mounting member 9, the claws 25 can be shut (or closed) against the elastic force (or spring reaction force) thereof. Incidentally, although these engaging claws 25 are provided in this embodiment so that paired ones 25 are opposed to each other, the manner of arrangement of the claws 25 is not limited thereto. Any other arrangement thereof may be employed, as long as the claws 25 are radially arranged around the vertical shaft 22 or engage the mounting member 9.

Figure 7B:
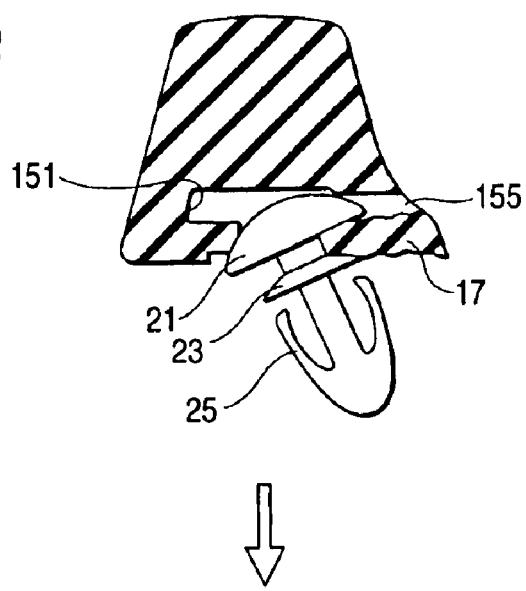
Figure 7C:
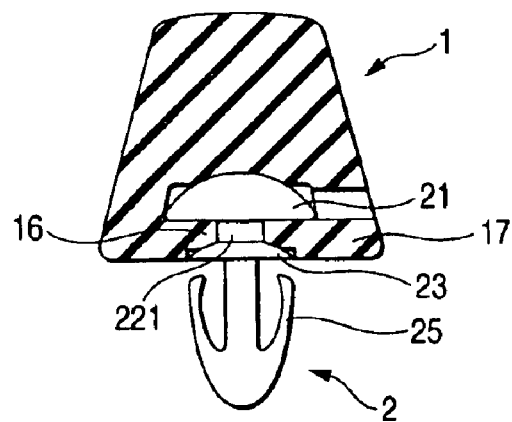

Next, a procedure for performing the connection (or integration) between the plastic clip 2 of such a configuration and the cushion body 1 made of a rubber material is described with reference to FIGS. 7A to 7C. First, as shown in FIG. 7A, one of the end parts of the horizontal head 21 of the T-shaped part of the clip 2 is inserted into the pit 152 of the cushion body 1. Subsequently, during such a state, the already inserted one of the end parts of the horizontal head 21 is pushed toward the through cave 155 provided in the cave 151 of the cushion body 1 by simultaneously snapping the entire clip 2, as illustrated in FIG. 7B. Then, the horizontal head 21 or the root portion 221 of the clip 2 causes a part provided around the engagement holes 15 of the cushion body 1, that is, the elastic deformation portion 17 to elastically deform. Thus, as shown in FIG. 7B, the whole engagement holes 15 are put into a largely opened state. During such a state, the entire horizontal head 21 of the clip 2 is inserted into the cave 151. Therefore, it is preferable that the elastic deformation portion 17 is formed in such a manner as to be thin-walled and as to be easily deformable.

In such an operation of fitting the horizontal head 21 into the cave 151, the elastic deformation of the elastic deformation portion 17 formed around the engagement hole 15 is relatively easily performed because of the fact that the through cave 155 is provided in such a manner as to be continued to the cave 151 in the side face part of the cushion body 1. Thus, an operation of mounting the horizontal head 21 and the root portion 221 of the clip 2 in the engagement hole 15 of the cushion body 1 is smoothly performed. Then, after the portions 21 and 221 are once mounted therein, a part provided around the engagement hole 15 is put back to an original state by an elastic force of the material. Thus, as illustrated in FIG. 7C, the horizontal head 21 and the flange portion 23 of the clip 2 engage around the bottom surface part 11 of the cushion body 1. The connection between both the clip 2 and the cushion body 1 is reliably established. Moreover, the projection portion 211 provided at the end part of the horizontal head 21 of the clip 2 is inserted into the recess portion 154 provided in the cave 151 of the cushion body 1. Thus, the positioning of the horizontal head 21 of the clip 2 is reliably performed. Therefore, during a state in which such a cushion is mounted in the mounting member 9 (see FIG. 8), both the cushion body 1 and the clip 2 do not disengage from each other.

Next, an operation of this embodiment of such a configuration is described hereinbelow with reference to FIG. 8. That is, in this embodiment, the clip 2 contributing to the mounting of the cushion in the mounting member 9 is formed from a plastic material having a predetermined stiffness. Moreover, the engaging claws 25 contributing to the engagement thereof in the mounting hole 91 provided in the mounting member 9 are adapted to have a predetermined repulsive force (that is, a predetermined spring reaction force). Thus, the cushion can easily be mounted (or assembled) in the mounting hole during a state in which these engaging claws 25 are closed and shut. Further, after the cushion is once mounted therein, the engaging claws 25 returns to an original state by an inherent elastic force (or spring reaction force) thereof, so that the claws 25 have a spread shape. Then, the claws 25 having been in such a spread condition engage in the mounting hole 91 of the mounting member 9, so that this cushion does not easily disengage from the mounting member 9. Further, during the use of the cushion after mounted therein, the through cave 155 is hidden from the outside by setting the position of the through cave 155 formed in the cushion body 1 of this cushion of the aforementioned configuration, for example, at a place on the wall surface of the mounting member 9, as illustrated in FIG. 8. Thus, the appearance of the cushion is not impaired. Furthermore, it is desirable that the through cave 155 is short. Therefore, it is possible that the position of the engagement hole 15 provided in the cushion body 1 is set in such a way as to be eccentric with respect to the axis center line of the cushion body 1.

According to the invention, a cushion is configured so that the clip comprises a horizontal head and a vertical shaft provided in such a way as to extend in a direction perpendicular to the horizontal head, that the clip is adapted to have a plurality of engaging claws formed at an end part of the vertical shaft in such a way as to flare toward the horizontal head therefrom, that on the other hand, the cushion body is formed in such a way as to perform a cushioning function, and as to have a cave, with which the horizontal head of the clip engages, and a pit, which accommodates the vertical shaft of the clip, that the cushion body further has a through hole formed in such a way as to extend in a horizontal direction from an end of the cave, and that an elastic deformation portion is formed around the cave, the pit and the through hole. With such a configuration, according to this cushion of the invention, the integration of the clip and the cushion body is achieved by performing a simple assembling operation. Further, the cushion formed in this manner can be easily mounted on the mounting member by shutting the engaging claws. Moreover, after the cushion is once mounted therein, the engaging claws engage the mounting member, so that the cushion does not easily disengage therefrom.

Further, according to the invention, when the clip is mounted in the engagement hole of the cushion body, the following procedure is performed. That is, an end part of the horizontal head of the clip is inserted into the pit, and the inserted end part of the horizontal head of the clip is led to the through hole formed in such a manner as to be opened in a side face part of the cushion body. During such a state, the entire horizontal head of the clip is inserted into the cave, and the root part of the vertical shaft is inserted into the pit by simultaneously and elastically deforming the elastic deformation portion of the cushion body thereby to perform integration of the cushion body and the clip. Thus, the attachment of the clip to the cushion body is conducted by performing a simple snap operation. Moreover, the clip and the cushion body are rigidly connected to each other. Furthermore, in the case of the cushion formed in this manner, the mounting thereof to the mounting member is easily performed. Further, after the cushion is once mounted therein, the engaging claws engage the mounting member, so that the cushion does not easily disengage therefrom.

Figure 9:
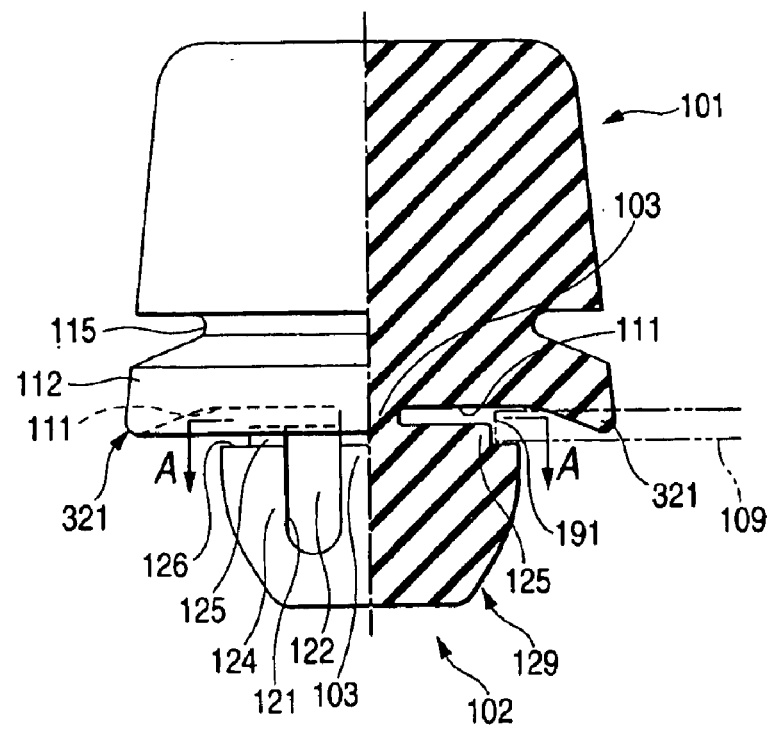
FIG. 9 is a half-sectional and outside view illustrating the configuration of the entire cushion according to the invention.
Figure 10:
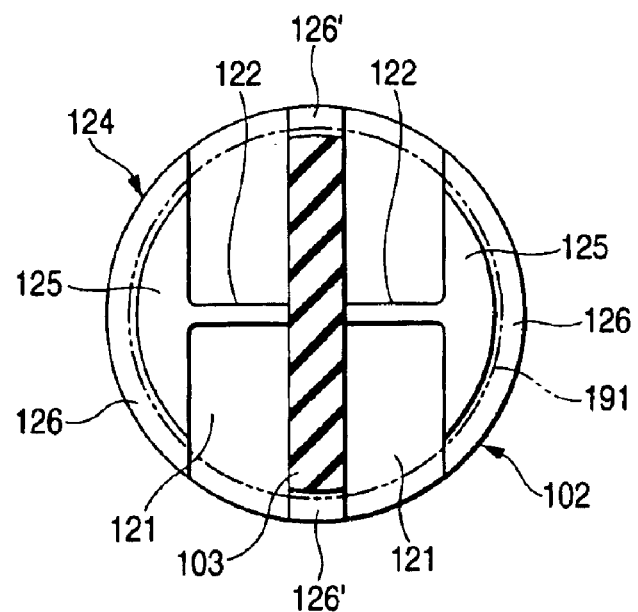
FIG. 10 is a sectional view taken along the line A—A of FIG. 9, which illustrates the configuration of the entire engagement portion that is a primary part of the cushion according to the invention.
Figure 11:
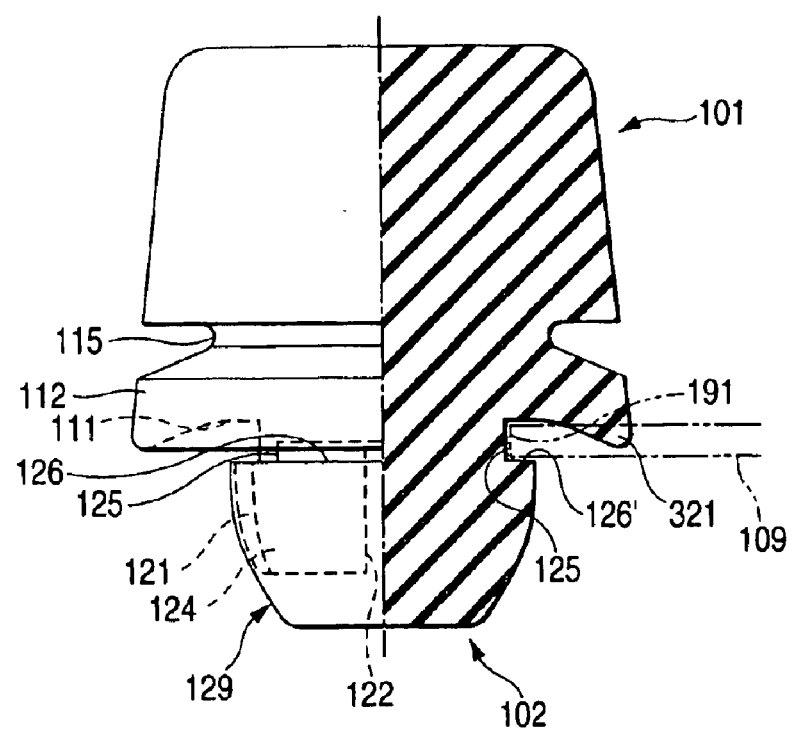

Hereinafter, a second embodiment of the invention is described with reference to FIGS. 9 to 13. As shown in FIGS. 9 and 11, this second embodiment is configured in such a way as to basically comprise a cushion body 101 serving as stopper, and also has an engagement portion 102 provided in such a way as to be continued to the cushion body 101 and as to contribute to the mounting thereof onto a mounting member 109. Furthermore, this second embodiment further comprises a connecting portion 103 that is operative to connect between the engagement portion 102 and the cushion body 101 and that is formed in such a way as to easily bend and elongate. Further, these portions are integrally formed from rubber-like elastic elements.

In the cushion of such a basic configuration, the cushion body 101 is often shaped like a frustum. However, it is sometimes possible that the cushion body 101 is shaped like a column or a distorted quadrangular pyramid. Further, in the cushion body 101 of such a shape, a circumferential groove 115 is provided in the vicinity of the bottom surface portion 111 thereof, as illustrated in FIGS. 9 and 11. Thus, an annular flange portion 112 is formed in the vicinity of the bottom surface portion 111. Further, as shown in FIGS. 9 and 11, a ring-like projection portion 321 is provided over the circumference of the bottom surface portion 111. The flange portion 112 is made by the action of this ring-like projection portion 321 and the circumferential groove to be easy to bend in the direction of an axis of the cushion body 101. Moreover, the flange portion 112 exerts a spring reaction force in such a direction.

Next, the engagement portion 102 provided in such a way as to be erected on the bottom surface part 111 of the cushion body 101 of such a configuration through the connecting portion 103 is described hereinbelow. As illustrated in FIGS. 9 and 11, the engagement portion 102 is basically shaped like a frustum or a cone. A lead-in portion 129 constituted by a tapered surface formed in such a manner as to taper off toward an end part thereof is provided therein. As shown in FIG. 9, in this embodiment, a plurality of internal-space grooves 121 are provided in the engagement portion 102 of such a configuration in such a way as to extend in parallel to the direction of an axis of the portion 102. Incidentally, although this internal-space groove 121 is opened toward the bottom surface portion 111 of the cushion body 101 in the longitudinal direction (or the axial direction) thereof, a lower part of the groove 121 dead-ends at a midway point in the lead-in portion 129 at the opposite side and thus is not dug to the leading-edge of the portion 129. Further, as illustrated in FIG. 10, the internal-space grooves 121 are provided so that the transversal sections thereof are opposed to each other in a transversal section of the engagement portion 102 in such a manner as to be symmetrical with respect to the centerline thereof. Furthermore, a thick wall portion to be provided between such opposed internal-space grooves 121 among such grooves 121 is formed in such a manner as to be thin-walled. Moreover, this thin film portion 122 formed in such a manner as to be thin-walled is connected to a side face part of the connecting portion 103 (to be described later) at right angles thereto. As a result of providing such a thin film portion 122 therein, an occurrence of what is called a falling phenomenon or a spreading phenomenon of longitudinal wall portions 124 formed along the side face parts of the thin film portions 121 is restrained by an elastic resistance force corresponding to elongation deformation of the thin film portion 122.

Further, a fitting portion 125 is provided on a side of this engagement portion 102 of such a configuration, which side faces the bottom surface part 111 of the cushion body 101, and formed (see FIG. 10) in such a way as to protrude toward the bottom surface portion 111 and as to be inserted into a mounting hole 191 provided in the mounting member 109. Furthermore, as shown in FIGS. 9 and 10, an engaging face portion 126 formed in such a way as to have a circular-arc shape and a predetermined width is provided on a circumferential edge part of the fitting portion 125. When this cushion is mounted in the mounting hole 191 of the mounting member 109, a part of the mounting member 109, which is placed around the mounting hole 191, is held in such a manner as to be fastened with such an engaging face portion 126, engaging face portions 126', which are formed at both end portions in the longitudinal direction of the connecting portion 103, and the ring-like projection portion 321 provided at the side of the bottom surface part 111 of the cushion body 101.

The connecting portion 103 for connecting between the cushion body 101 and the engagement portion 102, which are configured in such manners, is shaped like a plate. The transversal section of the connecting portion 103 is shaped like a rectangle, as illustrated in FIG. 10. Further, such a connecting portion 103 is connected to the central portion of the bottom part 111 of the cushion body 101 at one end thereof in such a way as to be erected thereon, and also connected to the central part of the engagement portion 102 at the other end thereof in such a manner as to be erected thereon. Furthermore, as illustrated in FIG. 10, the engagement portions 126' formed on the same circumference as that, on which the circular-arc engaging face portion 126 is formed, is provided at both end portions in the longitudinal direction of the transversal section of such a connecting portion 103. Further, the internal-space grooves 121 are provided in the side surface parts of this connecting portion 103 in such a manner as to extend along the portion 103 (see FIG. 10). Furthermore, as shown in FIG. 10, the thin film portion 122 formed between the bottom portions of the opposed ones of such internal-space grooves 121 is provided in such a way as to be perpendicular to the side face portions in the longitudinal direction in the transversal section of this connecting portion 103. That is, the connecting portion 103 and the thin film portion 122 are formed in such a way as to be orthogonal to each other.

Next, a procedure for mounting (or attaching) this second embodiment of such a configuration onto the mounting member 109, and an operation to be performed during the inputting of a load acting in a direction perpendicular to the axis of the cushion upon completion of mounting thereof are described hereinbelow. First, when this cushion is mounted thereon, the lead-in part 129 of the engagement portion 102 is inserted into the mounting hole 191. Moreover, the cushion body 101 of this cushion is pushed against the mounting member 109. Then, the cushion bends at a part of each of the internal-space grooves 121, that is, at the thin film portion 122, so that the entire engagement portion 102 is reduced in diameter. Thus, the lead-in part 129 is smoothly led into the mounting hole 191. Further, an outer circumferential part of the flange portion 112 is caused by the action of the circumferential groove 115, which is provided at an upper part of the flange portion 112, to upwardly bend against a pushing force exerted from an upper part of the cushion body 101. Consequently, the engagement portion 102 and the connecting portion 103 are pushed into the mounting hole 191 more deeply. As a result, the engagement portion 102 is relatively easily inserted into the mounting hole 191. Thus, this cushion is easily mounted on the mounting member 109. Further, after the cushion is once mounted (or attached) thereonto, the engaging face part 126 of the engagement portion 102 engages around the mounting hole 191 even when a load exerted in the direction perpendicular to the axis thereof or in an oblique direction acts upon the cushion body 101. This prevents this cushion from disengaging from the mounting hole 191.

Figure 12:
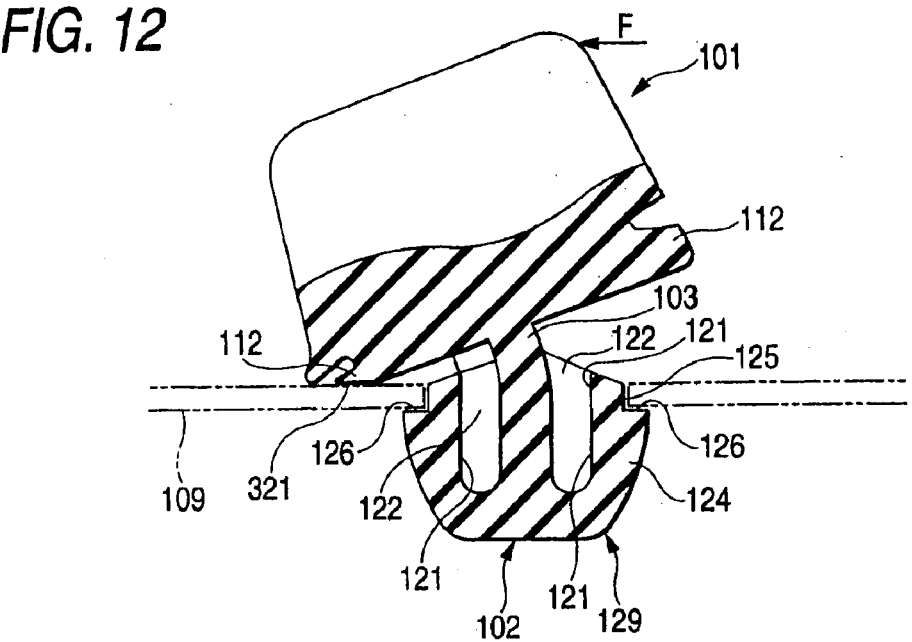
FIG. 12 is a partly sectional view illustrating a state in which a load acting in a direction perpendicular to the axis of the cushion according to the invention is inputted thereto.

A practical example of such an operation is described hereinbelow with reference to FIGS. 12 and 13. First, an operation in the case, in which a load (or force) F is inputted from a direction perpendicular to a longitudinal side face part in the transversal section of the plate-like connecting portion 103, as illustrated in FIG. 12, is described hereunder. In this case, the connecting portion 103 is in a state in which this portion 103 easily bends. Thus, the connecting portion 103 bend-deforms in the direction that is nearly perpendicular to the axis of the cushion. Thus, a part of the outer circumferential portion of the flange portion 112 comes in contact with a surface of the mounting member 109. This prevents the connecting portion 103 from further bending. Therefore, the engaging face portions 126 and 126' provided in the engagement portion 102 maintain a state in which the engaging face portions engage a mounting face provided around the mounting hole 191. Consequently, this engagement portion 102 does not disengage from the mounting hole 191. Further, the connecting portion 103 is bent by the action of the load F acting in the direction perpendicular to the axis thereof. Thus, a force acting in such a way as to increase the distance between the longitudinal wall portion 124 and the connecting portion 103 is exerted on this longitudinal wall portion 124 placed around each of the internal-space grooves 121 provided in the engagement portion 102. However, because of the fact that the thin film portion 122 is provided therebetween, the thin film portion 122 resists against the force acting in such a manner. Consequently, a part placed around the lead-in portion 129, which is a longitudinal bottom portion of each of the internal-space grooves 121, is not inverted (see FIG. 12). Therefore, the longitudinal wall portion 124 provided around each of the internal-space grooves 121 is not drawn into the mounting hole 191 by the load acting in the direction perpendicular to the axis of the cushion. As a result, the engaging face portions 126 reliably engage a face provided around the mounting hole 191.

Figure 13:
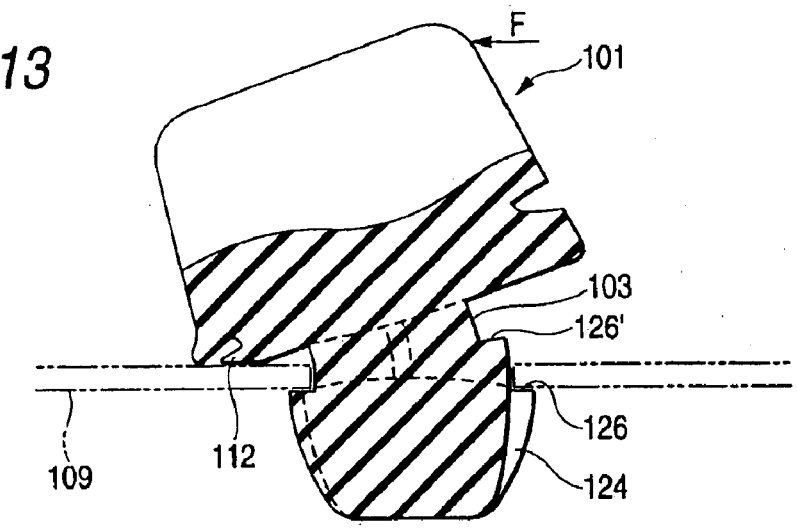
FIG. 13 is a partly sectional view illustrating a state in which a load acting in a direction perpendicular to the axis of the cushion according to the invention is inputted thereto in the case that the load is applied thereto in a direction perpendicular to a direction in which the load is applied thereto, as shown in FIG. 12.
Figure 14:
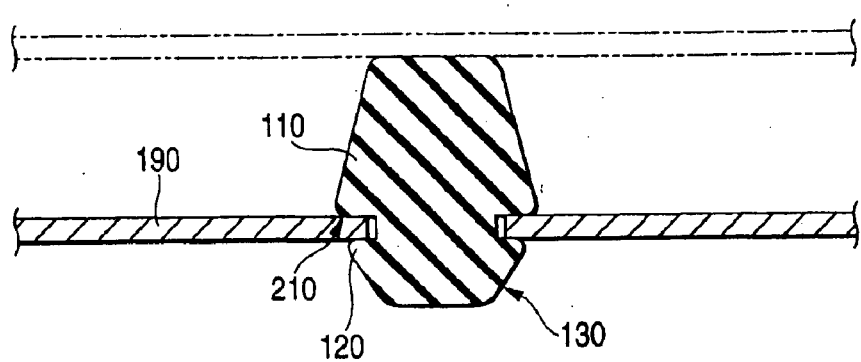
FIG. 14 is a longitudinally sectional view illustrating the configuration of the entire conventional cushion.

Further, when the load (F) applied in the direction perpendicular to the axis of the cushion acts along the longitudinal direction of the connecting portion 103, as illustrated in FIG. 13, the connecting portion 103 deforms so that one of the longitudinal end parts in a transversal section of the connecting portion 103 elongates. Thus, an outer circumferential part of the flange portion 112 formed in a lower part of the cushion body 101 is in contact with a part of the mounting member 109, which part is provided around the mounting hole 191, so that no more deformation is caused in the connecting portion 103. Incidentally, at that time, between the engaging face portions 126' formed at both the longitudinal end portions in the transversal section of the connecting portion 103, the elongated portion 126' disengages from the mounting face provided around the mounting hole 191. However, the circular-arc engaging face portions 126 (see FIG. 10) formed at both the longitudinal side face parts of this connecting portion 103 maintain a state in which these portions 126 engage the end face of the mounting hole 191 (see FIG. 13). Thus, in response to the inputting of the load (or force) F acting in a direction perpendicular to the axis of the cushion body 101, the engagement portion 102 of this cushion reliably engages around the mounting hole 191.

According to the second embodiment of the invention, there is provided a cushion that has a cushion body serving as stopper and also has an engagement portion provided in such a way as to be continued to the cushion body and as to contribute to the mounting thereof onto a mounting member. This cushion is provided with a connecting portion, which is formed entirely from a rubber-like elastic element in such a way as to be easily deformable, for connecting between the engagement portion and the cushion body. Furthermore, in this embodiment, the engagement portion is shaped like a frustum. Moreover, in the cushion of the invention, a plurality of internal-space grooves are provided in such a way as to be arranged in a direction of an axis of the engagement portion. With such a configuration, when the cushion of this invention is mounted onto the mounting member, the engagement portion is reduced in diameter by the action of the internal-space groove. Thus, an operation of mounting the cushion in the mounting hole provided in the mounting member can smoothly be performed. Further, after the cushion is once mounted therein, the connecting portion deforms in response to a load inputted in the direction perpendicular to the axis thereof, so that a side face part of the cushion body comes in contact around the mounting face of the mounting member. Thus, no more load (or force) is applied to the engagement portion. Consequently, the engagement portion is held in a state in which the engagement portion is engaged around the mounting hole of the mounting member. As a result, the cushion of the invention does not drop off from the mounting member.

Further, in the cushion of the invention, the connecting portion is shaped like a plate. Moreover, another embodiment of the invention is provided with a thin film portion formed in such a manner as to intersect a transversal section of the engagement portion and as to be perpendicular to the longitudinal direction of the connecting portion. In the case of such the embodiment, the entire engagement portion can be reduced in diameter by elastically deforming the thin film portion. Consequently, the mounting of the cushion on the mounting member is easily performed. After the cushion is once mounted thereon, the thin film is caused by the extension resistance thereof to act in such a manner as to restrain the longitudinal wall portion formed around the internal-space groove from falling down. Thus, the entire engagement portion maintains a state in which the engagement portion engages around the mounting hole. Consequently, the engagement portion does not easily drop off in response to the load inputted in the direction perpendicular to the axis of the cushion.

What is claimed is:

1. A cushion comprising:

a cushion body serving as a stopper; and a clip fitted to said cushion body and adapted to be attached to a mounting member so that the cushion is mounted on the mounting member, said clip including a horizontal head and a vertical shaft extending in a direction perpendicular to said horizontal head, said vertical shaft having an engagement portion to be engaged with said mounting member;

wherein said cushion body is formed so as to perform a cushioning function, wherein a cave for accommodating said horizontal head of said clip, a pit for accommodating said vertical shaft of said clip and a through hole extending in a horizontal direction from an end of said cave are formed in said cushion body, and wherein elastic deformation portions are formed around said cave, said pit and said through hole.

2. A cushion according to claim 1, wherein during a state in which an end part of said horizontal head of said clip is inserted into said pit, and in which said inserted end part of said horizontal head of said clip is led to said through hole being opened to a side face of said cushion body, the entirety of said horizontal head of said clip is inserted into said cave as well as said vertical shaft is simultaneously inserted into said pit while elastically deforming said elastic deformation portions of said cushion body, whereby said cushion body and said clip are integrated.

3. A cushion according to claim 1, wherein said horizontal head of said clip is shaped generally as a spherical segment of at least one base.

4. A cushion according to claim 1, wherein said clip is T-shaped.

5. A cushion according to claim 1, wherein a flange portion is provided at a lower part of said horizontal head as well as on said vertical shaft projecting in a direction perpendicular to an axis of said cushion.

6. A cushion according to claim 3, wherein the at least one base of the spherical segment has a large area relative to a height of the segment.

7. A cushion according to claim 1, further comprising a recess portion provided at an end portion of the cave opposite the through hole, and a projection portion formed on an end part of the horizontal head to mate with the recess portion.

8. A cushion according to claim 5, further comprising a plurality of claws extending from a lower portion of the flange portion.

9. A cushion according to claim 8, wherein the plurality of claws are adapted to be alternative engaged to and disengaged from the mounting member.

10. A cushion according to claim 8, wherein the claws are adapted to have a predetermined spring reaction force.

11. A cushion according to claim 1, wherein an axis of the pit is eccentric with respect to an axis of the cushion body.

12. A method of assembling a cushion comprising:

providing a cushion body serving as a stopper; and providing a clip fitted to said cushion body and adapted to be attached to a mounting member so that the cushion is mounted on the mounting member, said clip including a horizontal head and a vertical shaft extending in a direction perpendicular to said horizontal head, said vertical shaft having an engagement portion to be engaged with said mounting member;

wherein said cushion body is formed so as to perform a cushioning function, accommodating said horizontal head of said clip in a cave formed in said cushion body and a through hole extending in a horizontal direction from an end of said cave formed in said cushion body, accommodating said vertical shaft of said clip in a pit formed in said cushion body, and wherein elastic deformation portions are formed around said cave, said pit and said through hole.

13. A method according to claim 12, wherein during a state in which an end part of said horizontal head of said clip is inserted into said pit, and in which said inserted end part of said horizontal head of said clip is led to said through hole being opened to a side face of said cushion body, the entirety of said horizontal head of said clip is inserted into said cave as well as said vertical shaft is simultaneously inserted into said pit while elastically deforming said elastic deformation portions of said cushion body, whereby said cushion body and said clip are integrated.

14. A method according to claim 12, wherein at least one of (i) said horizontal head of said clip is shaped generally as a spherical segment of at least one base and (ii) said clip is T-shaped.

15. A method according to claim 12, wherein a flange portion is provided at a lower part of said horizontal head as well as on said vertical shaft projecting in a direction perpendicular to an axis of said cushion.

* * * * *